United States Patent
Schatz et al.

(10) Patent No.: US 7,191,221 B2
(45) Date of Patent: Mar. 13, 2007

(54) METHOD FOR MANAGING ELECTRONIC MAIL RECEIPTS USING AUDIO-VISUAL NOTIFICATION ENHANCEMENTS

(75) Inventors: Harry Schatz, McLean, VA (US); Carl Phillip Gusler, Austin, TX (US); Rick Allen Hamilton, II, Charlottesville, VA (US); James Wesley Seaman, Falls Church, VA (US)

(73) Assignee: International Business Machines Corporation, Armonk, NY (US)

( * ) Notice: Subject to any disclaimer, the term of this patent is extended or adjusted under 35 U.S.C. 154(b) by 546 days.

(21) Appl. No.: 10/697,900

(22) Filed: Oct. 30, 2003

(65) Prior Publication Data

US 2005/0097176 A1 May 5, 2005

(51) Int. Cl.
*G06F 15/16* (2006.01)
(52) U.S. Cl. ........................ 709/206; 709/217
(58) Field of Classification Search ........ 709/200–207, 709/217–227
See application file for complete search history.

(56) References Cited

U.S. PATENT DOCUMENTS

| | | | |
|---|---|---|---|
| 5,867,281 A * | 2/1999 | Nozoe et al. | 358/402 |
| 6,058,395 A * | 5/2000 | Buzaglo et al. | 707/10 |
| 6,437,873 B1 | 8/2002 | Maeda | 358/1.15 |
| 6,457,044 B1 | 9/2002 | IwaZaki | 709/206 |
| 6,498,841 B2 | 12/2002 | Bull | 379/142.08 |
| 6,760,752 B1 * | 7/2004 | Liu et al. | 709/206 |
| 6,898,625 B2 * | 5/2005 | Henry et al. | 709/206 |
| 6,999,989 B2 * | 2/2006 | DeLaCruz | 709/204 |
| 7,085,812 B1 * | 8/2006 | Sherwood | 709/206 |
| 2002/0007453 A1 * | 1/2002 | Nemovicher | 713/155 |
| 2002/0046250 A1 * | 4/2002 | Nassiri | 709/206 |
| 2002/0104026 A1 * | 8/2002 | Barra et al. | 713/202 |
| 2002/0116508 A1 * | 8/2002 | Khan et al. | 709/229 |
| 2002/0143881 A1 | 10/2002 | DeLaCruz | 709/206 |
| 2003/0131060 A1 * | 7/2003 | Hartselle et al. | 709/206 |
| 2004/0139314 A1 * | 7/2004 | Cook et al. | 713/151 |
| 2004/0186884 A1 * | 9/2004 | Dutordoir | 709/206 |

FOREIGN PATENT DOCUMENTS

| | | |
|---|---|---|
| JP | 2002063111 A2 | 2/2000 |
| JP | 2002164911 A2 | 6/2002 |
| WO | WO 01/97432 A2 | 12/2001 |
| WO | WO 01/97432 A3 | 12/2001 |

* cited by examiner

*Primary Examiner*—Moustafa M. Meky
(74) *Attorney, Agent, or Firm*—David A. Mims; Darcell Walker

(57) ABSTRACT

The present invention provides a monitoring subsystem that would capture all incoming MDN messages (return receipts), and rather than posting individual MDN notes in the user's in-box, a tracking and update subsystem would correlate the incoming responses by reading the appropriate fields in the captured MDN message, and would then use this data to update/create the new functionality.

9 Claims, 7 Drawing Sheets

To: _____
Subject: _____
Cc: _____
Bcc: _____
Attachment: _____

Send —35
Reply —36
Reply All —37
Delete —39
Forward —38
Return Receipt —40

Return Receipt

41— List: ☐
42— Highlight ☐
43— Bold ☐
44— Italicize ☐
45— Color ☐
46— Save ☐
47— Discard ☐

[OK] [Cancel]

FIG. 3b

| |
|---|
| To: JohnDoe@company.com, JaneDoe@company.com |
| cc: LukeDoe@company.com, RitaDoe@company.com |
| bcc: FredDoe@company.com |
| Subject: Today's Customer Meeting |

FIG. 6a

| |
|---|
| To: JohnDoe@company.com, JaneDoe@company.com |
| cc: LukeDoe@company.com, RitaDoe@company.com |
| bcc: FredDoe@company.com |
| Subject: Today's Customer Meeting |

FIG. 6b

| To: JohnDoe@company.com, JaneDoe@company.com |
|---|
| cc: LukeDoe@company.com, RitaDoe@company.com |
| bcc: FredDoe@company.com |
| Subject: Today's Customer Meeting |

JohnDoe@company.com, received 10/01/2002-08:53AM EST
JaneDoe@company.com, unread
LukeDoe@company.com, unread
RitaDoe@company.com, received 10/02/2002-10:22AM EST
FredDoe@company.com, unread

FIG. 6c

|   |
|---|
| The following return receipt has received |
| LukeDoe@company.com at Nov. 15, 2002, 11:25 AM EST |
| Save                       Discard |

FIG. 6d

METHOD FOR MANAGING ELECTRONIC MAIL RECEIPTS USING AUDIO-VISUAL NOTIFICATION ENHANCEMENTS

FIELD OF THE INVENTION

This invention relates to a method for managing the notification of electronic mail receipts and in particular to a method for using audio-visual enhancements to manage the notification and storage of electronic mail receipt acknowledgements.

BACKGROUND OF THE INVENTION

Electronic mail (email) communications are an integral part of any business, and widely used outside of business as well. Although several new technologies currently compete, as the most ubiquitous tool in business communications, email remains one of the single most used communications tools for both the business and the personal user. Widespread availability, ease of use, and functionality are key components which hold email in front of developing communications methods; however, as new technologies compete for the top spot, email applications must continue to build upon the strong foundation currently in place to maintain their edge as the tool of choice. By any current standard, email applications would have to be rated as mature technology; however, if improvements in email applications cease to move forward, and other tools continue to improve, loss of market share will undoubtedly result.

Because email communications are widely used in many activities inside and outside of the business world, ease of use and best of breed functionality are imperative in modern email systems. Many user interface enhancements have been added to email systems over the past several years; however, room for improvement continues to exist.

One such email enhancement has been the return receipt notification sent to the initiator/sender of an email message verifying the receipt of the email message at the destination location. In a conventional paper mail context, return receipts provide valuable information to senders of mail. With the return receipt, the sender can verify that the intended recipient received the mail where otherwise the sender would have to rely on, for example, contacting the recipient directly to confirm that the mail was received. Similarly, in an electronic mail context, return receipts are available to provide the sender of an electronic mail message some feedback as to the status of their electronic mail message. For example, the electronic mail message return receipt may provide information such as if the electronic mail message was received, opened or deleted unread.

One current shortfall in legacy email systems is the lack of flexibility with respect to return receipt behavior. Today, virtually all electronic mail applications place a new and separate "return receipt message" into the in-box of the message sender upon reading of the delivered message by each individual remote recipient, which, particularly in the case of a large delivery audience, may not be a desirable behavior.

Legacy return receipt behavior causes many busy professionals to spend untold time reading, compiling, and deleting a host of individual return receipts within their mailboxes. Therefore, it would be desirable to have a method for improving the shortcomings of the conventional electronic mail return receipt procedures. It would also be desirable to provide a method that would eliminate the large volume of return receipt messages that are collected at the message sender end, which creates the need to spend valuable time sorting, reviewing and deleting these return receipt messages.

SUMMARY OF THE INVENTION

It is an objective of the present invention to provide a method that will detect when an email recipient has received and opened an email message.

It is a second objective of the present invention to provide a method to notify the sender of an electronic message that a recipient of the message has opened the message.

It is a third objective of the present invention to provide a method and system for notification of return receipts of email messages in a manner such that the notification is not a separate conventional return receipt email message.

It is a fourth objective of the present invention to provide a more cohesive method and system to track receipt action of an email message.

The invention is the use of visual cues and/or audio notification for return receipt designation, such that separate return receipt notes are not created to inform the sender of the receipt of the email message. This present method eliminates clutter in the sender's in-box and provides a more cohesive means of tracking recipient's action, vis-à-vis legacy behavior.

With the introduction of the present invention, the message sender will no longer be required to plow through numerous return receipts, but rather, will have a central location, within, or associated with the original note, wherein the sender may view the recipient status of the entire message audience at one time and place. Additional detail will be provided in section two of this disclosure.

With the present invention, the user creates an email message in a conventional manner. The user will select a return receipt option for notification of the receipt of the email message at a destination location. At this point, the message is sent to a destination location. Upon the recipient opening of the message, a return receipt function creates and queues the return receipt. The return receipt is then routed back to the message initiator (sender). A return receipt manager function captures the incoming receipt and executes one or more steps to notify the sender of the receipt of the transmitted email message. The notification could be an audible tone in conjunction with or independent of visual notification means.

DESCRIPTION OF THE DRAWINGS

FIG. 3a is an illustration of a screen for an electronic message for transmission in accordance with the present invention.

FIG. 3b is an illustration of a screen or popup menu for selecting attributes that will control the display of return receipt information to the message initiator.

FIG. 6a is an illustration of a send-and-save message where the return receipt message is color coded to indicate the original message recipient.

FIG. 6b is an illustration of a send-and-save message where the return receipt message is bolded and italicized to indicate the original message recipient.

FIG. 6c is an illustration of a send-and-save message where the return receipt message is displayed in a status list that indicates the status of return receipts for the original message recipients.

FIG. 6d is an illustration of a pop-up send-and-save message displaying the status for a given message with save and discard options.

DETAILED DESCRIPTION OF THE INVENTION

Although several new technologies currently compete as the most ubiquitous tool in business communication, email remains one of the most heavily used tools for both the business and the personal user. Widespread availability, ease of use, and functionality are key components which hold email in front of developing communication methods; however, as new technologies compete for the top spot, email applications must continue to build upon the strong foundation currently in place to maintain their edge as the tool of choice. The present invention addresses the difficulties in managing electronic mail message return receipts, particularly where the delivery audience is large, and manual manipulation of many individual return receipts cumbersome.

Figure 1:
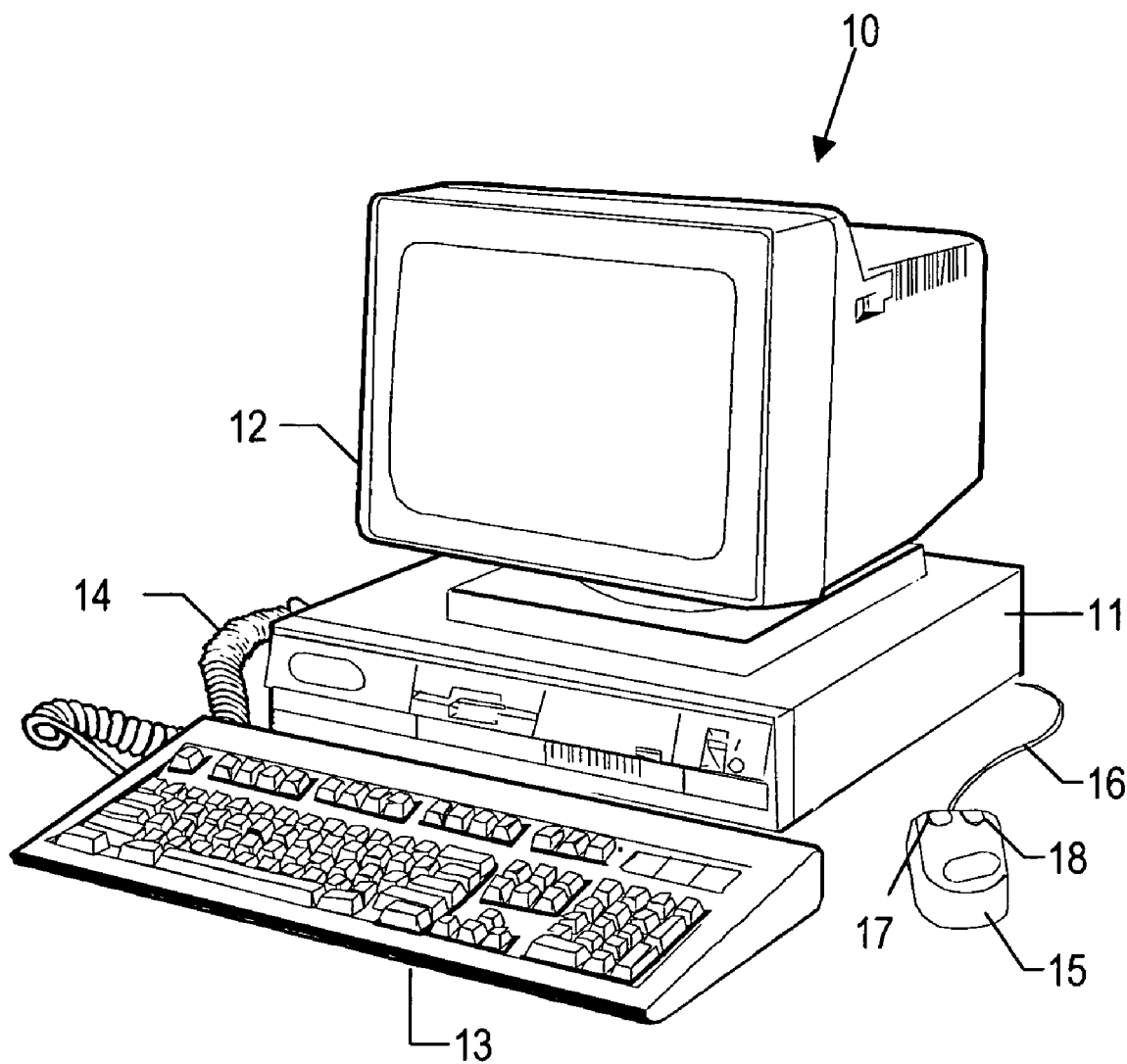
FIG. 1 is a conventional computing device used that can be used to transmit and receive electronic messages via a computer network.

In the description of the present invention, a return receipt is frequently known as a Message Disposition Notification, or MDN. In the paper below, both "return receipt" and "MDN" are used interchangeably. Electronic mail message transmissions occur over computing devices, usually personal computers, connected to a communication network. With reference now to FIG. 1, there is depicted a pictorial representation of computing device 10 which may be used in implementation of the present invention. As may be seen, data processing system 10 includes processor 11 that preferably includes a graphics processor, memory device and central processor (not shown). Coupled to processor 11 is video display 12 which may be implemented utilizing either a color or monochromatic monitor, in a manner well known in the art. Also coupled to processor 11 is keyboard 13. Keyboard 13 preferably comprises a standard computer keyboard, which is coupled to the processor by means of cable 14. Also coupled to processor 11 is a graphical pointing device, such as mouse 15. Mouse 15 is coupled to processor 11, in a manner well known in the art, via cable 16. As is shown, mouse 15 may include left button 17, and right button 18, each of which may be depressed, or "clicked", to provide command and control signals to data processing system 10. While the disclosed embodiment of the present invention utilizes a mouse, those skilled in the art will appreciate that any graphical pointing device such as a light pen or touch sensitive screen may be utilized to implement the method and apparatus of the present invention. Upon reference to the foregoing, those skilled in the art will appreciate that data processing system 10 may be implemented utilizing a personal computer.

The method of the present invention may be implemented in a global computer network environment such as the Internet. With reference now FIG. 2, there is depicted a pictorial representation of a distributed computer network environment 20 in which one may implement the method and system of the present invention. As may be seen, distributed data processing system 20 may include a plurality of networks, such as Local Area Networks (LAN) 21 and 22, each of which preferably includes a plurality of individual computers 23 and 24, respectively. Of course, those skilled in the art will appreciate that a plurality of Intelligent Work Stations (IWS) coupled to a host processor may be utilized for each such network. Any of the processing systems may also be connected to the Internet as shown. As is common in such data processing systems, each individual computer may be coupled to a storage device 25 and/or a printer/output device 26. One or more such storage devices 25 may be utilized, in accordance with the method of the present invention, to store the various data objects or documents which may be periodically accessed and processed by a user within distributed data processing system 20, in accordance with the method and system of the present invention. In a manner well known in the prior art, each such data processing procedure or document may be stored within a storage device 25 which is associated with a Resource Manager or Library Service, which is responsible for maintaining and updating all resource objects associated therewith.

Figure 2:
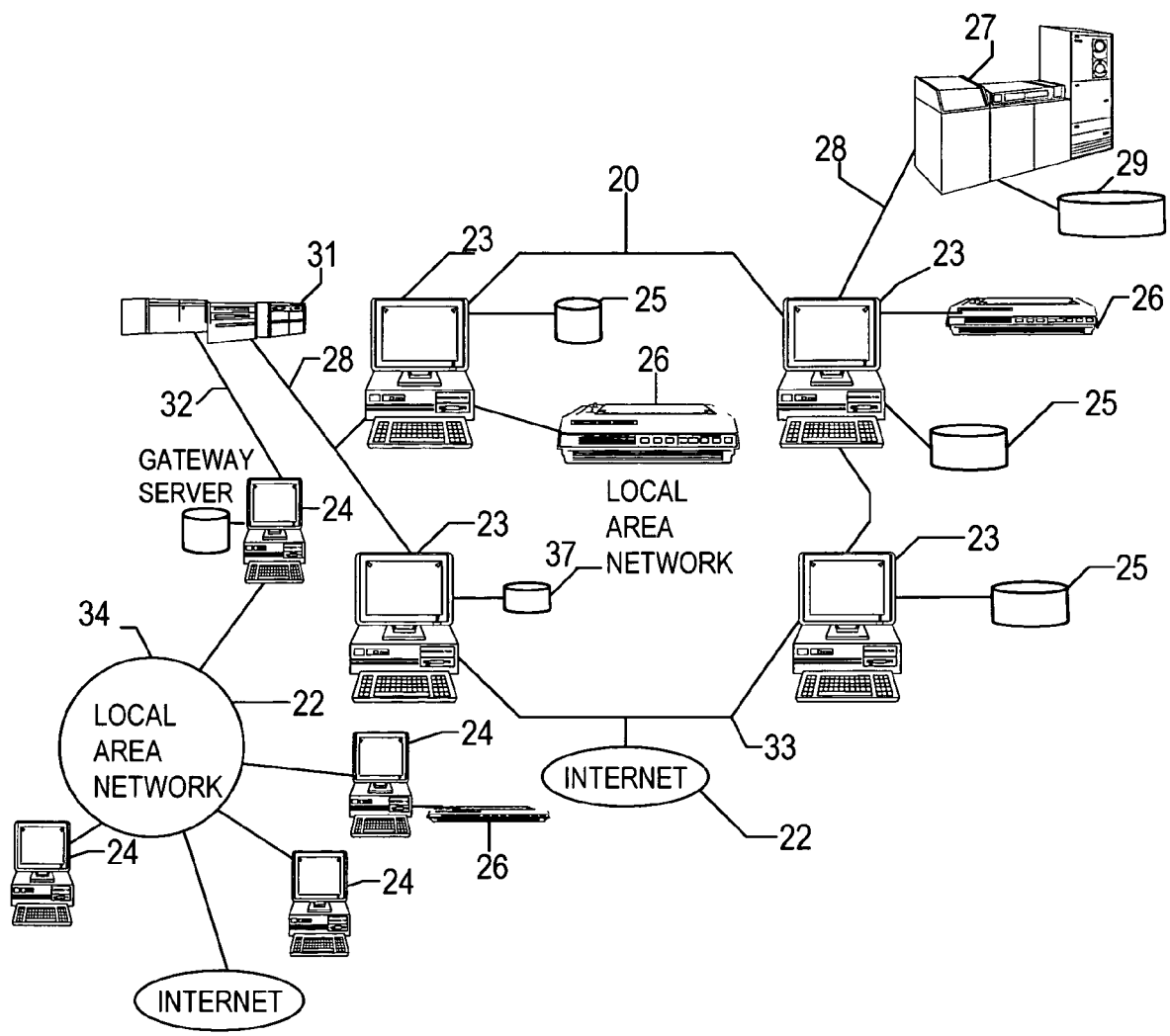
FIG. 2 is a diagram of a computer network over which electronic messages may be transmitted between a sender and receiver in the present invention.

Still referring to FIG. 2, it may be seen that distributed data processing system 20 may also include multiple mainframe computers, such as mainframe computer 27, which may be preferably coupled to Local Area Network (LAN) 21 by means of communications link 28. Mainframe computer 27 may also be coupled to a storage device 29 which may serve as remote storage for Local Area Network (LAN) 21. A second Local Area Network (LAN) 22 may be coupled to Local Area Network (LAN) 21 via communications controller 31 and communications link 32 to a gateway server 33. Gateway server 33 is preferably an individual computer or Intelligent Work Station (IWS), which serves to link Local Area Network (LAN) 22 to Local Area Network (LAN) 21. As discussed above with respect to Local Area Network (LAN) 22 and Local Area Network (LAN) 21, a plurality of data processing procedures or documents may be stored within storage device 29 and controlled by mainframe computer 27, as Resource Manager or Library Service for the data processing procedures and documents thus stored. Of course, those skilled in the art will appreciate that mainframe computer 27 may be located a great geographical distance from Local Area Network (LAN) 21 and similarly Local Area Network (LAN) 21 may be located a substantial distance from Local Area Network (LAN) 24. That is, Local Area Network (LAN) 24 may be located in California while Local Area Network (LAN) 21 may be located within Texas and mainframe computer 27 may be located in New York.

FIG. 3a illustrates a typical screen during the creation of an electronic message.

As shown, there is a text screen 34 for the message and the standard party and subject information To, Subject, Cc, Bcc and Attachments. In addition, there are control icons that allow a sender certain options before and during the transmission of the message. The icons can include send 35, Reply 36, Reply All 37, and Forward 38 and Delete 39. The screen for the present invention could contain an additional Return Receipt icon 40.

FIG. 3b shows a screen or popup menu for selecting attributes that will control the display of return receipt information to the message initiator. This menu appears on the screen when the message initiator clicks the Return Receipt icon 40. This menu can contain a list icon 41. The list function would cause a list to be created containing all of the addresses listed in an electronic message. Further discussion of this list will be during the description of FIG. 6c. Another option for the display of the return receipt information is to highlight the identity of the recipient location. This option can be executed by clicking the Highlight icon 42. In this FIG. 3b, the highlight option has display mode from which the user can select. This FIG. 3b, the options are Bold 43, Color 44 and Italicize 45. Also shown in the pop-up menu are save 46 and discard 47 icons. Selection of one of these icons can either save or discard the return receipts for a message.

In the implementation of the present invention, logic is added to electronic mail application to convert inbound return receipts to audio/visual indicators associated with the originating note. Implementing this function in code is possible by anyone with ordinary skill in the art. A monitoring subsystem would capture all incoming MDN messages (return receipts), and rather than posting individual MDN notes in the user's in-box, a tracking and update subsystem would correlate the incoming responses by reading the appropriate fields in the captured MDN message, and would then use this data to update/create the new functionality discussed in this disclosure. Such "bridge" functionality would include recognizing the incoming note as an MDN, and taking appropriate action in the user environment, per the options outlined below.

Figure 4:
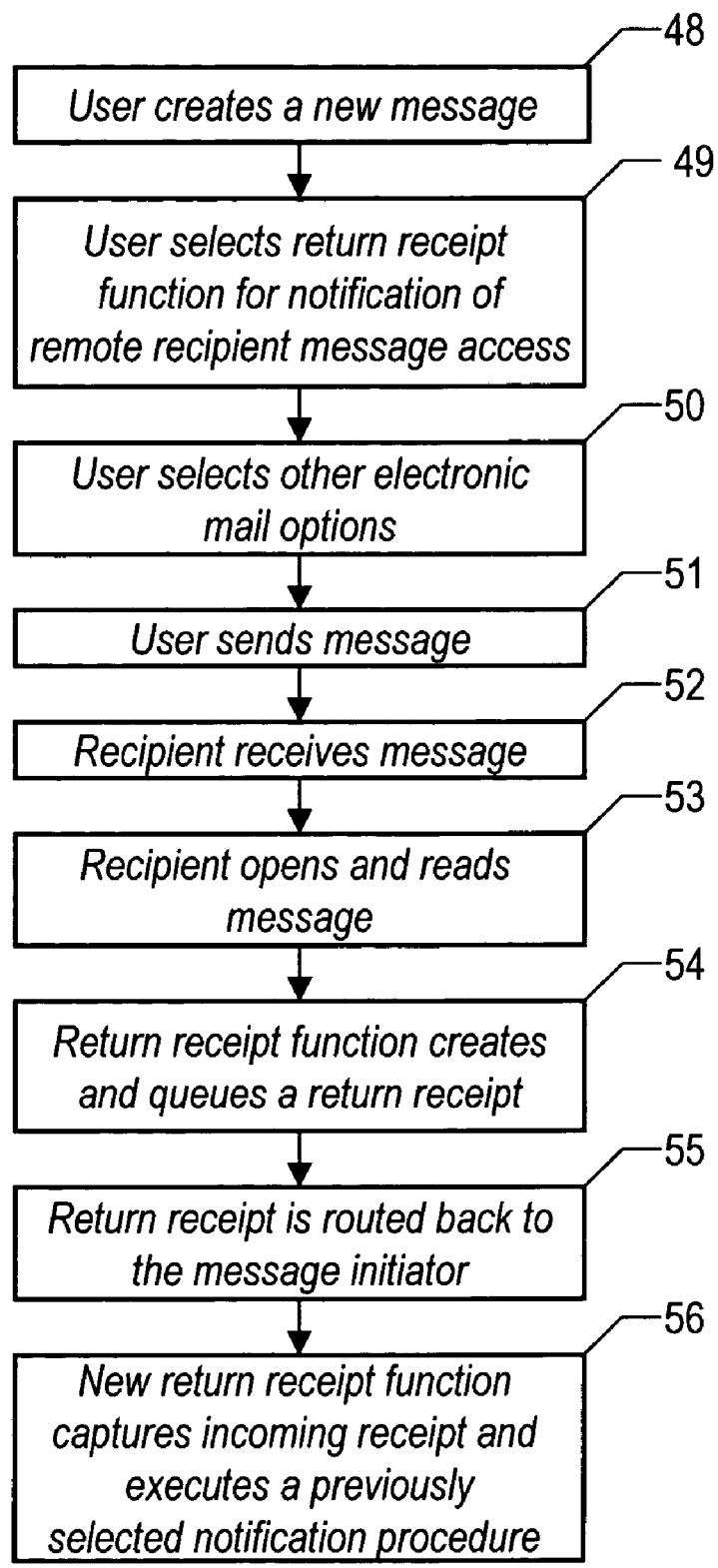
FIG. 4 is an overview flow diagram of a message transmission and return receipt process implemented in accordance with the implementation of the present invention.

FIG. 4 is an over view flow diagram of a message return receipt process implemented in accordance with the implementation of the present invention. In step 48, a user creates a new electronic message in a conventional manner. FIG. 3a shows a display of a typical electronic mail message. As part of this message creation, the user can select to have a return receipt notification when a receipt of the message receives and/or opens the message. If the user desires to have this return receipt notification, in step 49, the user selects legacy return receipt function for notification of remote recipient message access. This selection is initiated by clicking a Return Receipt icon 40, which can be part of the message display as shown in FIG. 3a. As previously discussed, the user would have an opportunity to select options for the message return receipt notification. In step 50, the user can select other conventional electronic mail options for the created message. At the completion of the creation of the message, in step 51, the user sends the message to the designated location(s). This step is typical electronic mail transmission across a computing network.

In step 52, the transmitted message is received at the designated recipient location. The opening of the message by a recipient in step 53 activates a return receipt function at the recipient location. The return receipt function, in step 54 can create and queue a return receipt for that recipient. Step 55 routes or sends this return receipt back to the user location that initiated the original message. A receipt return management function of the present invention captures the incoming message at the message initiator location in step 56. The return receipt is then displayed to the message initiator in accordance with the parameters selected by the message initiator in step 49. In the present invention, the return receipt notification does not appear as a separate message item in the inbox of the original message initiator/sender. This return receipt procedure does not affect the attributes of the electronic message transmission and receipt process.

Figure 5:
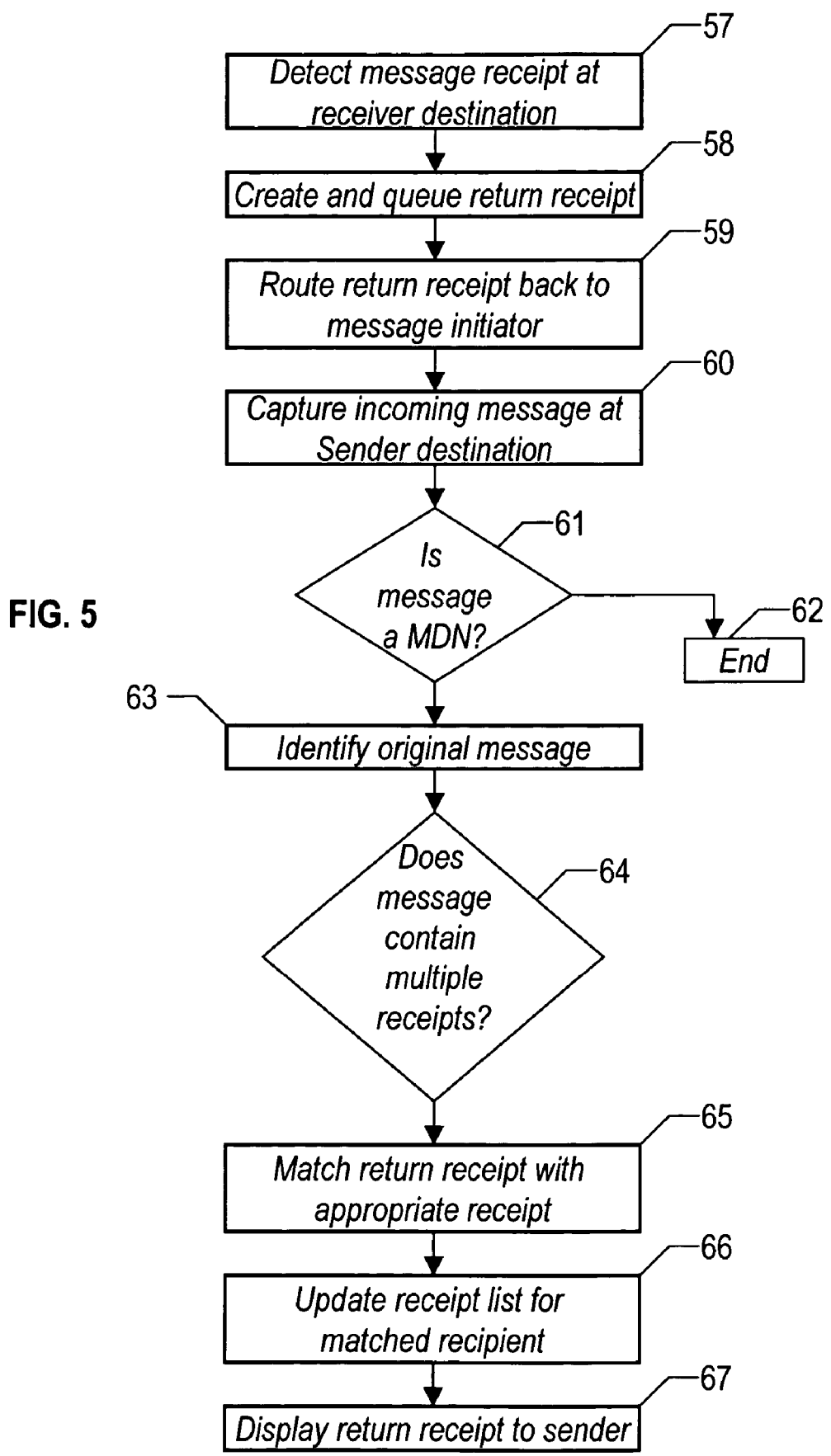
FIG. 5 is a flow diagram of the steps at the recipient location during the transmittal and return receipt method of the present invention.

FIG. 5 is a flow diagram of the steps at the recipient location during the transmittal and return receipt method of the present invention. In step 57, a transmitted message is detected at the receiver destination. A return receipt queue is created in step 58. This queue can be created when the message arrives at the recipient location or when the recipient actually opens the message. Step 59 transmits the return receipt back to the message initiator. Step 60 captures the incoming message at the message initiator location. This message capture function detects all incoming messages and therefore has to make a determination as to which messages are actually return receipt messages or Message Disposition Notifications (MDNs). This message determination occurs in step 61. Reading a particular message field that would only be present in the return receipt messages could accomplish this message determination. If the determination is that the captured message is not a return receipt, this return receipt process ends in step 62. However, if the determination is that the captured message is a return receipt, the method moves to step 63. At this point, it is necessary to identity the original message that corresponds to this return receipt. This process could involve the incorporation of a message identifier with the original message. This same identifier would be incorporated with any return receipt of that message to the message initiator.

Once the message is identified, an optional step 64 in the process of the present invention can be to determine whether there are multiple recipients of the original message. As shown in FIGS. 6a, 6b, 6c and 6d, a message may be sent to several recipients. The sender may want a notification when each recipient has opened the message. Again, if there is only one message recipient, the return receipt is displayed to the message initiator in step 67. However, if there is a determination that there are multiple recipients, the method moves to step 65. In this step, the particular captured return receipt is matched with the set of multiple recipients from the original message to determine the appropriate responding recipient. After this match, the list of message recipients can be updated, in step 66, to reflect the received return receipt. Once there is an identification of the responding recipient, the message initiator is notified and the return receipt is displayed to the message initiator.

In the present invention, there can be various implementations for displaying the receipt message. For illustrative purposes FIGS. 6a, 6b, 6c and 6d show varies displays in accordance with the present invention. Referring to FIG. 6a, shown is an illustration of a send-and-save message where the return receipt message is color-coded to indicate the original message recipient. The message recipients come from all of the different categories of recipients, which include direct recipients, TO, the carbon copy, cc, and the blind carbon copy, bcc. In this illustration, the message recipients JaneDoe@company.com, LukeDoe@company.com, and FredDoe@company.com can appear in a specified color for message recipients that have received and/or opened the electronic message.

Referring to FIG. 6b, the present invention illustrates the return receipt recipient's name in the originating, sent-and-saved note to be "font differentiated" as received (bold, italicized, font size, etc. . . . ). In this return receipt display, the recipients JohnDoe@company.com and RitaDoe@company.com are displayed as bolded and italicized.

FIG. 6c shows a return receipt display in which the recipients name in the originating message is updated in a "message recipient status list" via a "receipt returned" tracking function. As mentioned, at any time, the sender of the original message can retrieve and view the list of message recipients to learn which recipients have opened the message. The list shown in FIG. 6c contains the five recipients to which the sender addressed the original message. JohnDoe@company.com was received and opened on Oct. 1, 2002 at 8:53 AM. RitaDoe@company.com was received on Oct. 1, 2002 at 10:22 AM. At the time of the displayed list, the other recipients of the original message have not opened the message. In another embodiment, additional data could also be listed, such as the fact that not only was the note received, but also that a response had been generated.

FIG. 6d shows the return receipt display as a pop-up box containing the current return receipt status for a given message with save and discard options. When a recipient of the original message receives and/or opens the message, this pop-up message can be sent to the original message sender. In this display, the popup message shows the response of LukeDoe@company.com at Nov. 1, 2002.

An audible tone could be included in conjunction with or independent of, the visual notifications discussed above. As an example, a tone could be sounded upon either placing the curser over a recipient name or upon opening the sent copy of the note. It is also recognized by the inventors that although this invention is framed in terms of graphical and/or audible enhancements to a note in the "sent" folder, which is then populated according to the MDN's as they are received. In other words, although such enhancements are described using a saved copy of the original note, these enhancements may also be applied to a specialized copy of the note, which is saved in a predefined location.

This invention provides a unique and valuable new function, which will assist IBM in maintaining the lead in best of breed applications. Since current MDN standards do not contain the functionality described within this disclosure, the inventors would thus suggest that the three likely scenarios for implementing this invention would be to (1) update the MDN standards to allow for incorporation of the present invention, or (2) to implement a plug-in application or API to effect this invention with no change to the MDN standards, or (3) implement a stand alone application which could monitor the operating system network layer in order to manage and ac t upon MDN messages. All other legacy email functions remain in effect.

This invention is an important addition to email functionality providing for a robust closed loop system where it is important to receive responses to specific email notes. The inventors recognize that many embodiments of the invention are possible. It is important to note that while the present invention has been described in the context of a fully functioning data processing system, those skilled in the art will appreciate that the processes of the present invention are capable of being distributed in the form of instructions in a computer readable medium and a variety of other forms, regardless of the particular type of medium used to carry out the distribution. Examples of computer readable media include media such as EPROM, ROM, tape, paper, floppy disc, hard disk drive, RAM, and CD-ROMs and transmission-type of media, such as digital and analog communications links.

We claim:

1. A method for managing electronic mail return receipts using audio-visual notification comprising the steps of:
   initiating an electronic mail return receipt operation;
   determining features of a return receipt notification display, by prompting a message initiator to select a return receipt notification display procedure and capturing a highlighted recipient of the message at the message initiator location when a recipient has received and opened the message;
   detecting a message at the receiver destination;
   transmitting a return receipt back to the message initiator;
   capturing the return receipt at the message initiator location;
   identifying the specific receiver destination transmitting the return receipt; and
   displaying the specific receiver destination to the message initiator.

2. The method as described in claim 1 wherein the return receipt notification display procedure comprises creating a list of recipients of the original message at the message initiator location and indicating when a recipient from the recipient list has received and opened the message.

3. The method as described in claim 1 wherein said return receipt capturing step further comprises:
   intercepting an incoming message at the message initiator location;
   determining whether the detected message is message disposition notification;
   when the determination is the detected message is a message disposition notification, identifying the original message at the message initiator location; and
   matching the sender of the message disposition notification to a corresponding recipient on the original message transmitted by the message initiator.

4. A computer program product in a computer readable medium for managing electronic mail return receipts using audio-visual notification comprising:
   instructions for initiating an electronic mail return receipt operation;
   instructions for determining features of a return receipt notification display including instructions for prompting a message initiator to select a return receipt notification display procedure and instructions for capturing a highlighted recipient of the message at the message initiator location when a recipient has received and opened the message;
   instructions for detecting a message at the receiver destination;
   instructions for transmitting a return receipt back to the message initiator;
   instructions for capturing the return receipt at the message initiator location;
   instructions for identifying the specific receiver destination transmitting the return receipt; and
   instructions for displaying the specific receiver destination to the message initiator.

5. The computer program product as described in claim 4 wherein the return receipt notification display procedure comprises instructions for creating a list of recipients of the original message at the message initiator location and instructions for indicating when a recipient from the recipient list has received and opened the message.

6. The computer program product as described in claim 4 wherein said return receipt capturing instructions further comprise:
   instructions for intercepting an incoming message at the message initiator location;
   instructions for determining whether the detected message is message disposition notification;
   when the determination is the detected message is a message disposition notification, instructions for identifying the original message at the message initiator location; and
   instructions for matching the sender of the message disposition notification to a corresponding recipient on the original message transmitted by the message initiator.

7. The computer program product as described in claim 6 further comprising before said matching instruction, instructions for determining whether the original transmitted message had multiple recipients.

8. The computer program product as described in claim 4 further comprising before said return receipt transmitting instructions, instructions for creating a queue at a receiver destination and instructions for queuing a return receipt notification in response to the detection of the opening of a message at the receiver destination.

9. The computer program product as described in claim 4 wherein said display type determination instructions further comprise instructions for prompting the message initiator to select a return receipt notification display procedure.

* * * * *